United States Patent
Trommer et al.

[19]

[11] Patent Number: 5,820,074
[45] Date of Patent: Oct. 13, 1998

[54] DEPLOYMENT MECHANISM FOR RAM AIR TURBINE

[75] Inventors: William Charles Trommer; John David Grant, both of Rockford, Ill.

[73] Assignee: Sundstrand Corporation, Rockford, Ill.

[21] Appl. No.: 773,715

[22] Filed: Dec. 20, 1996

[51] Int. Cl.$^6$ .................................................. B64D 41/00
[52] U.S. Cl. ............................................................ 244/58
[58] Field of Search .................................. 244/56, 58, 66, 244/7 R, 102 SS, 102 SL; 416/142, 9; 290/55

[56] References Cited

U.S. PATENT DOCUMENTS

| | | | |
|---|---|---|---|
| 3,069,116 | 12/1962 | Ward | 244/58 |
| 3,451,648 | 6/1969 | Pabst et al. | 244/56 |
| 4,630,788 | 12/1986 | Veaux et al. | 244/102 SS |
| 4,717,095 | 1/1988 | Cohen et al. | 244/58 |
| 4,742,976 | 5/1988 | Cohen | 244/58 |
| 4,991,796 | 2/1991 | Peters et al. | 244/58 |
| 5,122,036 | 6/1992 | Dickes et al. | 417/222 |
| 5,174,719 | 12/1992 | Walsh et al. | 416/142 |
| 5,564,903 | 10/1996 | Eccles et al. | 244/58 |

*Primary Examiner*—Galen L. Barefoot
*Attorney, Agent, or Firm*—Harold A. Williamson

[57] ABSTRACT

The invention is directed to a deployment apparatus for an extendable ram air turbine of an aircraft. The ram air turbine is movable from a stowed inoperable position within the aircraft to a deployed and extended operable position externally of and in an airstream of the aircraft. The deployment apparatus includes an ejection member secured at one end to the aircraft and pivotally coupled to a non-extendable portion of a strut assembly. The non-extendable strut portion is pivotally secured at one end to the aircraft and receives at its other end in a telescoping manner one end of an extendable strut portion which has at its other end an air turbine driven power unit. An extendable strut portion control arrangement is responsive to a preset strut assembly deployed position and the presence of a predetermined power output level provided by the air turbine driven power unit to thereby ensure that the extendable strut and air turbine are extended only upon deployment of the strut assembly and activation of the air driven power unit.

13 Claims, 4 Drawing Sheets

DEPLOYMENT MECHANISM FOR RAM AIR TURBINE

FIELD OF THE INVENTION

This invention relates to a ram air turbine and more particularly to a deployment mechanism for a ram air turbine.

BACKGROUND OF THE INVENTION

For many years, aircraft have included, as standard equipment, a back-up power source for use in times of power outage in the main power system. This standard equipment has been in the form of an air driven turbine or fan which has a normal stowed position in a storage bay within the fuselage of the aircraft and which can be moved to a deployed position in an aircraft's passing airstream, thereby making use of the relative speed of the aircraft through the ambient air to cause the turbine blades to rotate. The ram air turbine can have either electrical generating gear or a hydraulic pump, or both, which are powered by rotation of the turbine blades due to movement through the airstream.

Given the design of modern aircraft wherein the efficient use of space is paramount, the storage bay of the aircraft, as well as an access door to the storage bay, are sized to store the ram air turbine and a deployment mechanism for the ram air turbine with only enough space to closely receive the equipment and thereby minimize wasted space. In most cases, the structural configuration of the storage bay cannot be modified without compromising the structural integrity of the aircraft.

Many, if not most, of the large commercial aircraft of today's passenger carrying fleets, are provided with emergency power via ram air turbines when the aircraft has lost main engine power. Upon loss of engine power and associated hydraulic power, the ram air turbine and its associated deployment mechanism are activated. At the time of the emergency, the aircraft is at altitude and maneuvering for an emergency landing, the ram air turbine is cleanly deployed into the ambient air through which the aircraft is passing. While it is desirable to land aircraft into the wind, the inability of the disabled aircraft to go around again frequently causes the aircraft to land such that it experiences cross winds. Moreover, some airports or situations may dictate that an upwind runway is not available, and the aircraft is thereby forced to use a cross-wind runway.

Ram air turbines readily accommodate cross wind when the aircraft is at altitude because of the high forward relative speed of the deployed ram air turbine through the ambient air. However, as a landing approach is made and the landing gear of the aircraft is lowered, the air flowing over the nose and the front landing gear of the aircraft during a cross-wind landing causes detrimental turbulence at the ram air turbine which results in a significant deterioration of the ram air turbine output at a time when control of the aircraft is critical. It has been discovered in the situation just described that, by extending the ram air turbine further into the airstream, the ram air turbine performance is significantly improved. The invention to be described hereinafter solves the air flow turbulence problem experienced by currently flying aircraft without the need to modify in any manner the aircraft storage bay configuration for the ram air turbine and its associated deployment mechanism.

SUMMARY OF THE INVENTION

The invention is directed to a deployment apparatus for an extendable ram air turbine of an aircraft. The ram air turbine is movable from a stowed inoperable position within the aircraft to a deployed and extended operable position externally of and, in an airstream of, the aircraft. The deployment apparatus includes an ejection member secured at one end to the aircraft and pivotally coupled to a non-extendable portion of a strut assembly. The non-extendable strut portion is pivotally secured at one end to the aircraft and receives at its other end in a telescoping manner one end of an extendable strut portion which has at its other end an air turbine driven power unit.

An extendable strut portion control arrangement is responsive to a preset strut assembly deployed position and the presence of a predetermined power output level provided by the air turbine driven power unit to thereby ensure that the extendable strut and air turbine are extended only upon deployment of the strut assembly and activation of the air driven power unit.

It is, therefore, a primary object of the invention to provide a ram air turbine deployment mechanism which deploys a strut assembly from within an aircraft into a nearly deployed position and then automatically extends a strut member carrying the ram air turbine an additional distance to ensure the ram air turbine is positioned in the aircraft airstream which is substantially free of interfering turbulence induced by the air flowing over the aircraft's nose and front landing gear.

In the attainment of the foregoing object, the invention more specifically contemplates that the air driven power unit is a hydraulic pump which provides a predetermined hydraulic pressure level. The extendable strut portion control arrangement of the deployment mechanism further includes a strut assembly locking device which cooperates with the non-extendable and extendable strut portions. The strut assembly locking device is responsive to a hydraulic pressure provided by the ram air turbine driven hydraulic pump, which pressure acts to unlock the extendable strut portion from the non-extendable strut portion only when the ram air turbine is driven as a consequence of the ram air turbine being in the aircraft airstream and the strut assembly being in the preset strut assembly deployed position.

Another significant feature of the invention resides in the provision of a pressure responsive means to cause the extendable strut portion to move from its locked, non-extended position to a fully extended position to thereby obtain maximum cooperation of the ram air turbine and the aircraft airstream. More specifically, the pressure responsive means includes a pair of non-extendable transfer sleeve members concentrically mounted within a cylindrical portion of the non-extendable strut portion. Within a cylindrical portion of the strut portion, a concentrically mounted extendable transfer sleeve has one end telescopingly fitted within an inner cylindrical non-extendable transfer sleeve of the pair of cylindrical concentrically mounted non-extendable transfer sleeve members. The hydraulic pump has a high pressure output port in direct hydraulic communication with the strut assembly locking device via this extendable transfer sleeve and the inner non-extendable transfer sleeve. The hydraulic high pressure, when acting on a surface of a portion of the locking device, provides a force to unlock the strut assembly locking device and sequentially causes the extendable transfer sleeve and associated extendable strut portion to move the ram air turbine and hydraulic pump into the extended position. An extendable strut return mechanism is provided to return the extendable strut to an unextended position in the absence of hydraulic pressure from the ram air driven hydraulic pump.

Yet another important component of the extendable strut portion control arrangement takes the form of a ram air turbine release pin which engages the ram air turbine to hold the same from rotation and is responsive to a passage of a preset strut assembly deployed position to disengage the pin from the ram air turbine and allow the same to spin. The preset strut assembly deployed position is near a fully deployed strut assembly position.

Other objects and advantages of the present invention will become apparent from the ensuing description and the illustrated embodiment thereof, in the course of which reference is made to the accompanying drawings.

DETAILED DESCRIPTION OF THE PREFERRED EMBODIMENT

Figure 1:
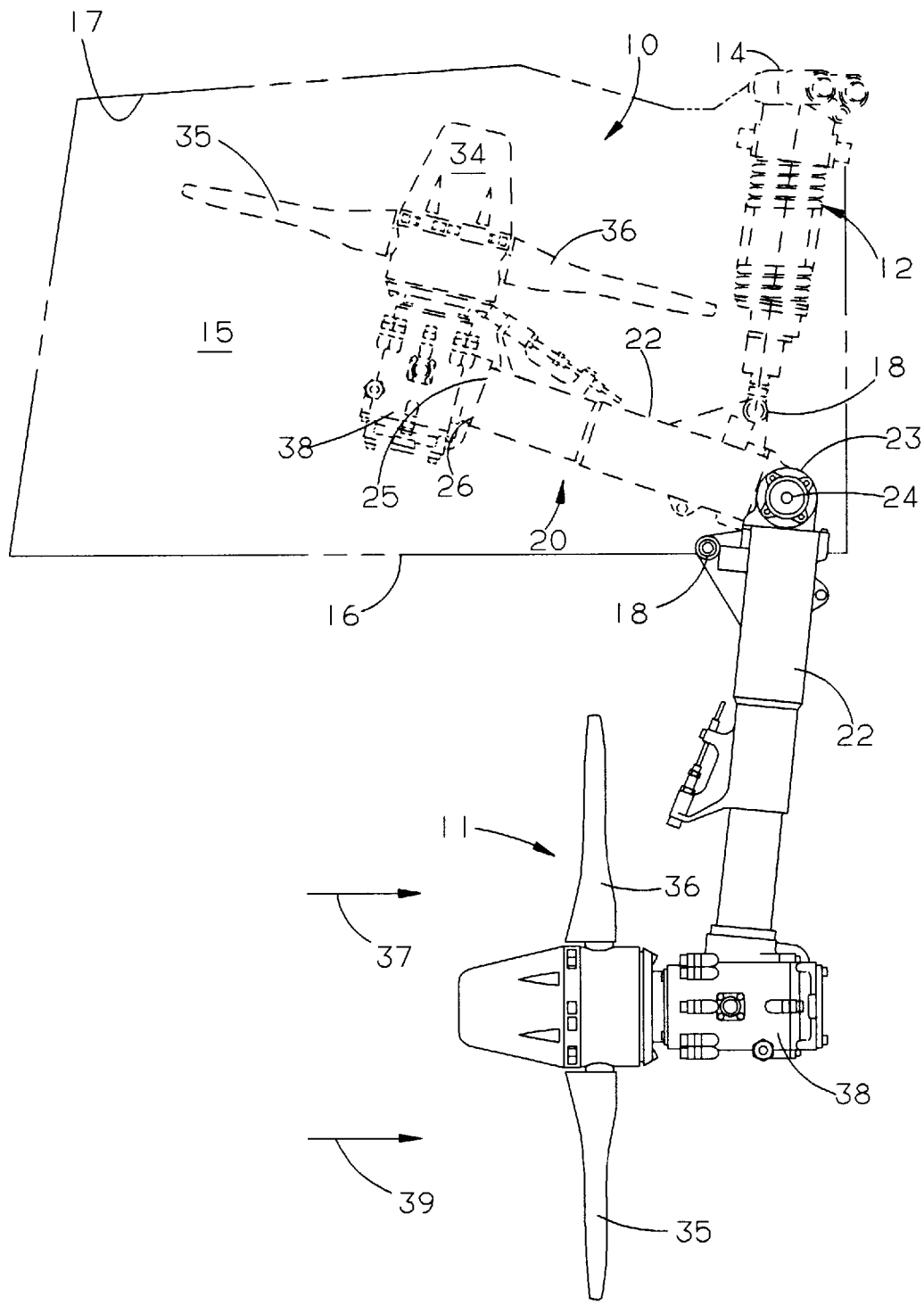
FIG. 1 is a side elevational view of the ram air turbine deployment mechanism embodying the invention shown in deployed position in full line and in stowed position in broken line.

Reference is now made to FIG. 1 which illustrates a side elevational view of the ram air turbine deployment apparatus embodying the invention. A stowed ram air turbine 10 is shown in phantom broken line manner, whereas the ram air turbine 11 shown in full line depicts ram air turbine 34 extended to place air turbine blades 35, 36 in an aircraft airstream indicated by arrows 37, 39. The aircraft fuselage 16 is designated schematically by a broken line, and storage bay 15 and its envelope are defined by the broken line 17. The structural configuration of the storage bay 15 is such that it cannot be modified without compromising the structural integrity of the aircraft airframe.

Figure 2:
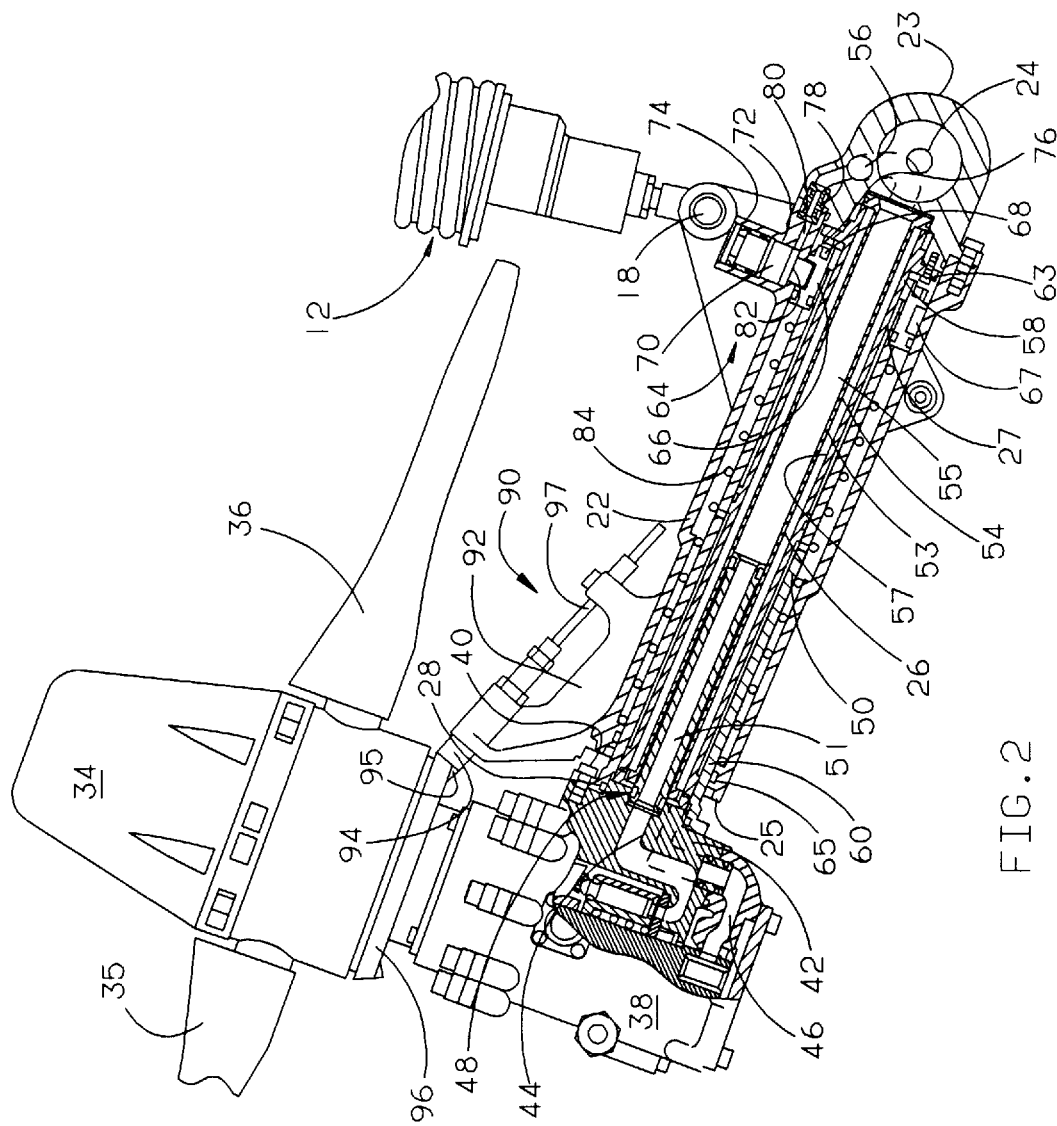
FIG. 2 is a partial section of the strut assembly of FIG. 1 showing the strut assembly in the stowed position.

In order to appreciate the structural cooperation of the various components which make up the deployment apparatus which constitutes the invention, attention is now directed to FIG. 2 which is to be studied in conjunction with FIG. 1.

FIG. 2 illustrates in full line a partial cross section of the stowed strut assembly 20 shown in phantom line in FIG. 1. The reference numerals of FIG. 1, which are directed to various aspects of the strut assembly 20, are presented only as a visual reference to tie together the detailed description of FIG. 2 to follow.

The deployment apparatus includes a spring loaded ejection member 12 which may also be referred to as an ejection jack 12. The ejection member 12 is secured at one end 14 to the aircraft frame in a manner not shown. The spring loaded ejection member 12 does not form a part of the instant invention. Any of a number of ejection jack arrangements which are commercially available may be employed as long as they are provided with a pivotal coupling 18 which cooperates with a non-extendable strut portion 22 of a strut assembly 20.

The non-extendable strut portion 22 is pivotally secured, as shown, at one end 23 thereof to the aircraft by pivot pin 24. The non-extendable strut portion 22 receives at its other end 25, in a telescoping manner, an end 27 of an extendable strut portion 26.

A hydraulic pump 38 is secured by fasteners, such as bolt 40, to another end 28 of extendable strut portion 26. The details of the hydraulic pump 38 do not form a part of the instant invention. The function of the pump 38, however, is important to gaining an understanding of the invention. Suffice it to say that the pump 38 includes a pump housing 42 which includes therein a high pressure output port 44 and a low pressure return port 46. A ram air turbine 34, with its associated turbine blades 35, 36, cooperates with the hydraulic pump 38 to drive the same in a wholly conventional manner.

Nested within and secured at point 48 to the hydraulic pump 38 is a high pressure extendable transfer tube 50. The interior 51 of the high pressure transfer tube 50 is in direct communication, as shown, with high pressure output port 44 of the pump 38.

A non-extendable upper high pressure transfer tube 54 cooperates, as shown, with the high pressure extendable transfer tube 50, as shown. High pressure fluid provided by pump 38 is delivered into high pressure extendable transfer tube 50, the interior 55 of the upper high pressure non-extendable transfer tube 54 to a high pressure internal conduit 56 located in the end 23 of non-extendable strut portion 22.

Positioned between extendable strut portion 26 and the upper high pressure non-extendable transfer tube 54 is a non-extendable hollow concentric shaft 58. The hollow non-extendable concentric shaft 58 is secured at one end by fasteners, such as bolt 63, to the end 23 of the non-extendable strut portion 22. At the other end of non-extendable hollow concentric shaft 58, a male spline section 60, shown in dotted line, cooperates with an internal female splined section 61 (see FIG. 3 for better showing) of extendable strut portion 26.

At a left-hand end of the upper high pressure non-extendable transfer tube 54, as FIG. 2 is viewed, a plurality of low pressure passages 65, allow for a low pressure hydraulic fluid return path to exist between an outer surface 53 of the upper high pressure non-extendable tube 54 and an inner surface 57 of the non-extendable hollow concentric shaft 58. The unreferenced low pressure hydraulic fluid return path which exists between transfer tube 54 and hollow concentric shaft 58, as just described, communicates with low pressure return portion 46 of the hydraulic pump 38.

Although not shown in the drawings, it is to be understood that the unreferenced low pressure return path, at the right-hand end of transfer tube 54 and hollow concentric shaft 58 as FIG. 2 is viewed, is in fluid communication with hydraulic equipment aboard the aircraft, which is also not shown.

Attention will now be focused on what has been referred to hereinbefore as an extendable strut portion control means which includes a strut assembly locking means designated by reference numeral 64 and an associated reference arrow. More specifically, the strut assembly locking means 64 includes a locking collar 66 which is provided with an annular groove 67, most clearly viewable in FIG. 3. The locking collar 66 is secured to the extendable strut portion 26 by means of a lock nut 68 on a threaded end (unreferenced) of extendable strut portion 26. A plunger spool member 70 is mounted for reciprocation in a spool support housing 72. A helical spring 74, positioned as shown, cooperates with the plunger spool 70 to bias the spool 70 toward the locking collar 66. The plunger spool 70 includes a locking pin portion 76 which engages the annular groove 67 of the collar 66. The spring 74 ensures that the locking pin portion 76 engages the annular groove 67.

It will be recalled that high pressure hydraulic fluid will be present in internal conduit 56 whenever the ram air turbine and its associated turbine blades 35, 36 engage the airstream 37, 39, which in turn causes the hydraulic pump 38 to deliver high pressure hydraulic fluid to the internal conduit 56 as described hereinbefore. High pressure fluid passes from conduit 56 via a transfer tube seal 78 to a high pressure conduit 80. The high pressure fluid in conduit 80 acts upon the side surface of spool land 82. This high pressure acting over the side surface of spool land 82 generates a force sufficient to disengage the locking spool member 70 and its associated locking pin portion 76 from the annular groove 67 of the locking collar 66, which thereby frees the extendable strut portion to move. A helical spring 84 is shown positioned between the non-extendable strut portion 22 and the extendable strut portion 26, as can be clearly seen in FIGS. 2 and 3.

The appearance of high pressure fluid within telescoping high pressure extendable transfer tube 50 and the upper high pressure non-extendable transfer tube 54 causes the extendable transfer tube 50 to move such that hydraulic pump 38 and ram air turbine 34 will be extended.

The extendable strut portion control means further includes a ram air turbine blade release mechanism 90. More specifically, the turbine blade release mechanism 90 includes a support bracket 92 which is formed integrally with the non-extendable strut portion 22. The structural details of the turbine release mechanism are not shown, as this type of device is a standard feature on ram air turbines. A movable detent element 94 cooperates with a mating stop member 95 on a rotating hub 96 of the ram air turbine 34. A blade release cable 97 is secured at one end to the movable detent element 94 and its other end to the airframe (in a manner not shown) such that a radial distance between a point where the blade release cable 97 is secured to detent element 94 and the point where the cable is secured to the airframe when the ram air turbine is in a stowed position is less than the radial distance between a point defined by the pivotal coupling pin 24 and the point where the cable is secured to the detent element 94 at an instant when the strut assembly 20 position (see FIG. 4), as indicated by center line 100, is just before the ram air turbine is fully deployed, i.e., center line position 101. If not for this timed release, the turbine blades could possibly strike the fuselage of the aircraft since the mechanism would not be extended away from the fuselage far enough to allow the blades to freely rotate.

Figure 4:
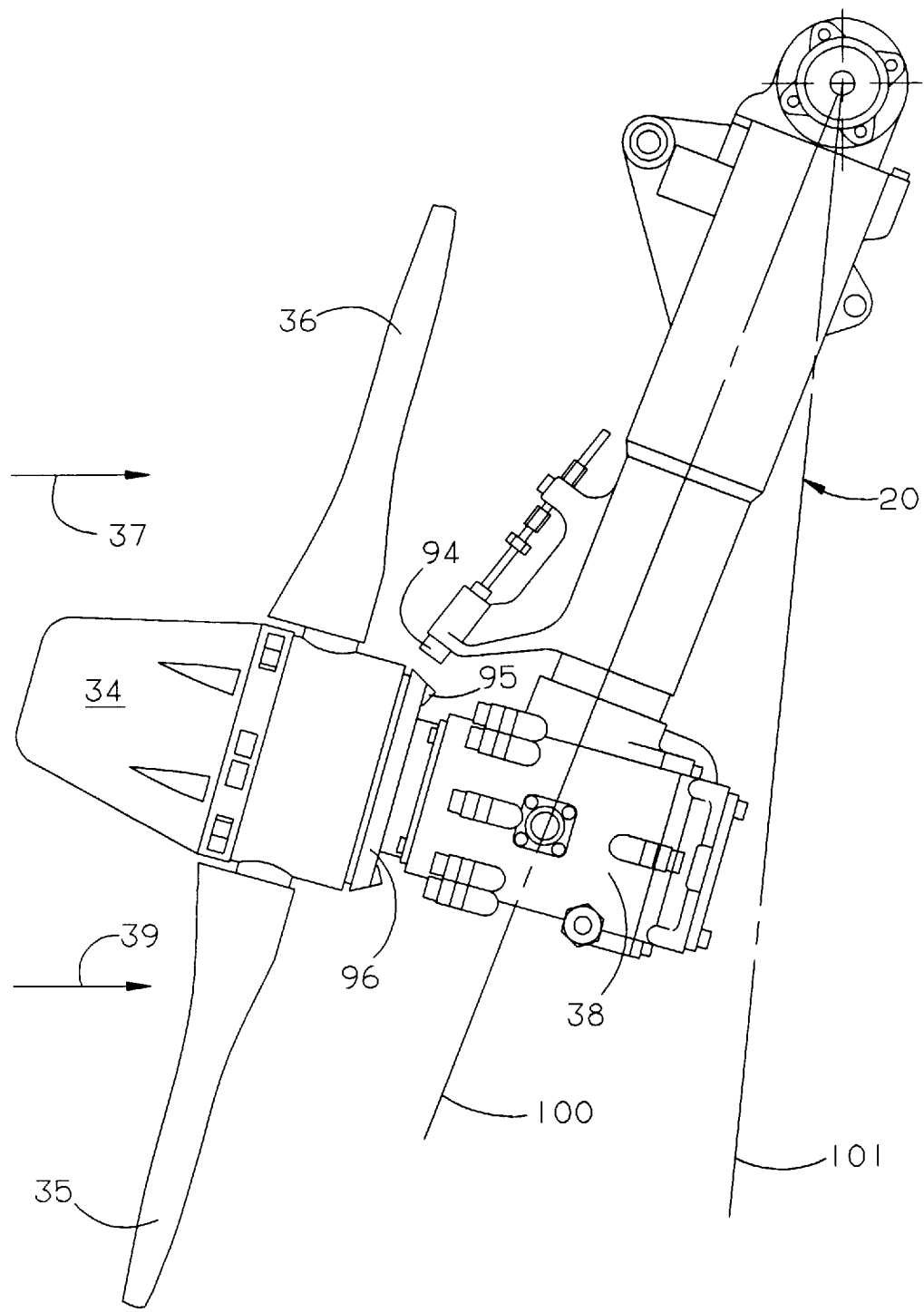
FIG. 4 is a side elevational view of a ram air turbine deployment mechanism fully deployed but not extended.

The above defined relationship between the release cable 97 and radial distances causes the rotatable ram air turbine hub 96 to be released, as shown in FIG. 4, just prior to the strut assembly 20 reaching a fully deployed position as shown in FIG. 1. At the moment the ram air turbine rotating hub 96 is released to rotate, the passing airstream 37, 39 interacts with turbine blades 35, 36 to drive the ram air turbine 34, which in turn powers the hydraulic pump 38. The delivery of power to the pump 38 by the ram air turbine 34 causes a rapidly increasing pressure to appear at the high pressure port 44 of the hydraulic pump 38. When the pump 38 hydraulic pressure output reaches a preset level sufficient to overcome the spring bias present in the strut assembly means 64, the locking spool member 70 moves against helical spring 74, and locking pin portion 76 is withdrawn from the annular groove 67 of the locking collar 66, thereby freeing the extendable strut portion 26 to be extended to a fully extended position.

Figure 3:
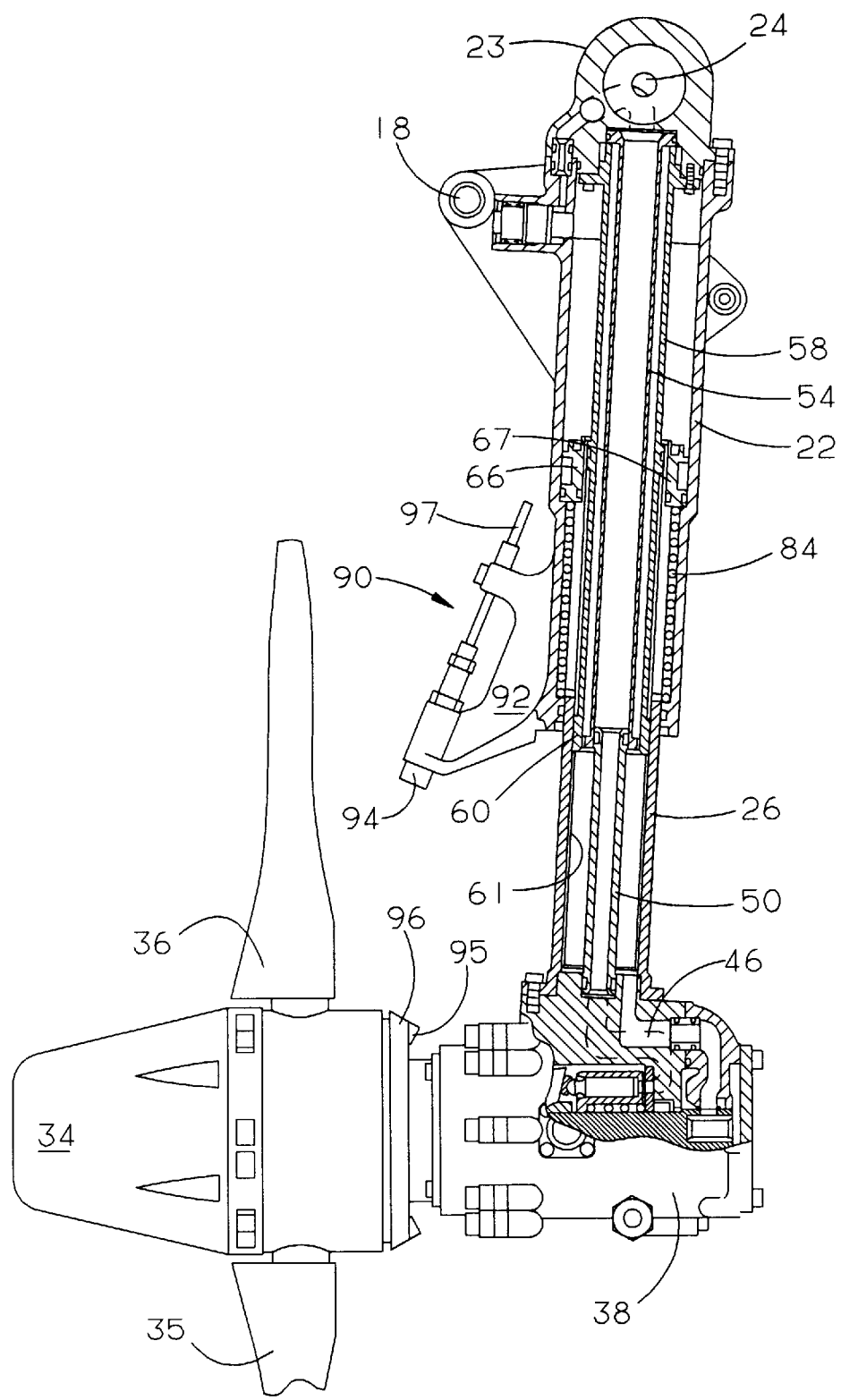
FIG. 3 is a partial section of the strut assembly of FIG. 1 showing the strut assembly fully deployed and a strut portion and ram air turbine fully extended.

Attention is directed to FIG. 3 which reveals a partial cross section of a fully extended and deployed ram air turbine 34 and strut assembly 20. It will be observed that helical spring 84 is in a compressed state when the strut assembly 20 is fully extended and deployed. At the time an aircraft employing the invention lands and comes to a stop, the ram air turbine 34 and its associated blades 35, 36 stop rotating, which in turn causes the fluid pressure in the strut assembly to drop to zero. With the hydraulic pressure at zero, the helical spring 84 is sized such that as it extends from its compressed state, the extendable strut portion 26 and ram air turbine 34 are drawn back into a non-extended position. Thereafter, either the ejection jack 12 may be operated to draw the ram air turbine into the stowed position shown in FIG. 1, or the ram air turbine may be manually stowed.

When the strut assembly 20 and ram air turbine 34 are fully extended and deployed as shown in FIG. 1, air flowing over the nose of the aircraft, and front landing gear, both of which are not shown, and cross winds during landing which strike the landing gear creating turbulence, are avoided because of the extended position of the ram air turbine 34.

Although this invention has been illustrated and described in connection with the particular embodiment illustrated, it will be apparent to those skilled in the art that various changes may be made therein without departing from the spirit of the invention as set forth in the appended claims.

We claim:

1. A deployment apparatus for an extendable air turbine of an aircraft, movable from a stowed inoperable position within the aircraft to a deployed and extended operable position externally of and in an airstream of the aircraft, said deployment apparatus comprising:

an ejection member secured at one end to said aircraft and pivotally coupled to a non-extendable strut portion of a strut assembly;

said non-extendable strut portion pivotally secured at one end to said aircraft, said unextendable strut portion receiving at its other end in a telescoping manner one end of an extendable strut portion which has at its other end an air turbine driven power means; and extendable strut portion control means responsive to a preset strut assembly deployed position and the presence of a predetermined power means output level provided by said air turbine driven power means to thereby ensure that said extendable strut and air turbine are extended only upon deployment of said strut assembly and activation of said air driven power means.

2. The apparatus of claim 1 wherein said power means is hydraulic in nature and said predetermined power means output level is a predetermined hydraulic pressure level.

3. The apparatus of claim 2 wherein said extendable strut portion control means includes a strut assembly locking means which is provided between said non-extendable strut portion and said extendable strut portion of said strut assembly.

4. The apparatus of claim 3 wherein said strut assembly locking means is responsive to a hydraulic pressure provided by said air turbine driven hydraulic power means to unlock said extendable strut portion from said non extendable strut portion only when said air turbine is driven as a consequence of said air turbine being in said airstream of said aircraft and said strut assembly being in said preset strut assembly deployed position.

5. The apparatus of claim 4 wherein said extendable strut portion control means further includes a hydraulic pressure responsive means to cause said extendable strut portion to move from its locked position relative to said non-extended position to a fully extended position to thereby obtain maximum cooperation of the associated air turbine with said aircraft airstream.

6. The apparatus of claim 5 wherein said hydraulic pressure responsive means includes a pair of cylindrical non-extendable transfer sleeve members concentrically mounted within a cylindrical portion of said non-extendable strut portion.

7. The apparatus of claim 6 wherein said hydraulic pressure responsive means further includes within said cylindrical portion of said extendable strut portion a concentrically mounted extendable transfer sleeve having one end telescopingly fitted within an inner cylindrical non-extendable transfer sleeve of said pair of cylindrical concentrically mounted non-extendable transfer sleeve members.

8. The apparatus of claim 7 wherein said hydraulic power means has a high pressure output port in direct hydraulic communication with said strut assembly locking means via said extendable transfer sleeve and said inner non-extendable transfer sleeve, said hydraulic high pressure providing a force to unlock said strut assembly locking means and simultaneously cause said extendable transfer sleeve and associated extendable strut portion to move said air turbine and hydraulic power means into said extended position.

9. The apparatus of claim 8 wherein said hydraulic power means further includes a low pressure return port in direct hydraulic communication with a space between said extendable transfer sleeve and said cylindrical portion of said extendable strut portion and a space between said pair of non-extendable cylindrical transfer sleeves of said non-extendable strut portion.

10. The apparatus of claim 9 wherein there is included in combination a return means to cause said extendable strut portion to return to an unextended position in the absence of hydraulic pressure from said hydraulic power means.

11. The apparatus of claim 10 wherein said return means includes a biasing means between said non-extendable strut portion and said telescoping extendable portion.

12. The apparatus of claim 11 wherein said biasing means is a helical spring interposed between and having its ends respectively secured to said unextended and extended strut portions.

13. The apparatus of claim 12 wherein said preset strut assembly deployed position is near a full strut assembly deployed position.

* * * * *